June 11, 1957  C. G. REYNARD  2,795,410
BATHROOM SCALE
Filed Dec. 1, 1954
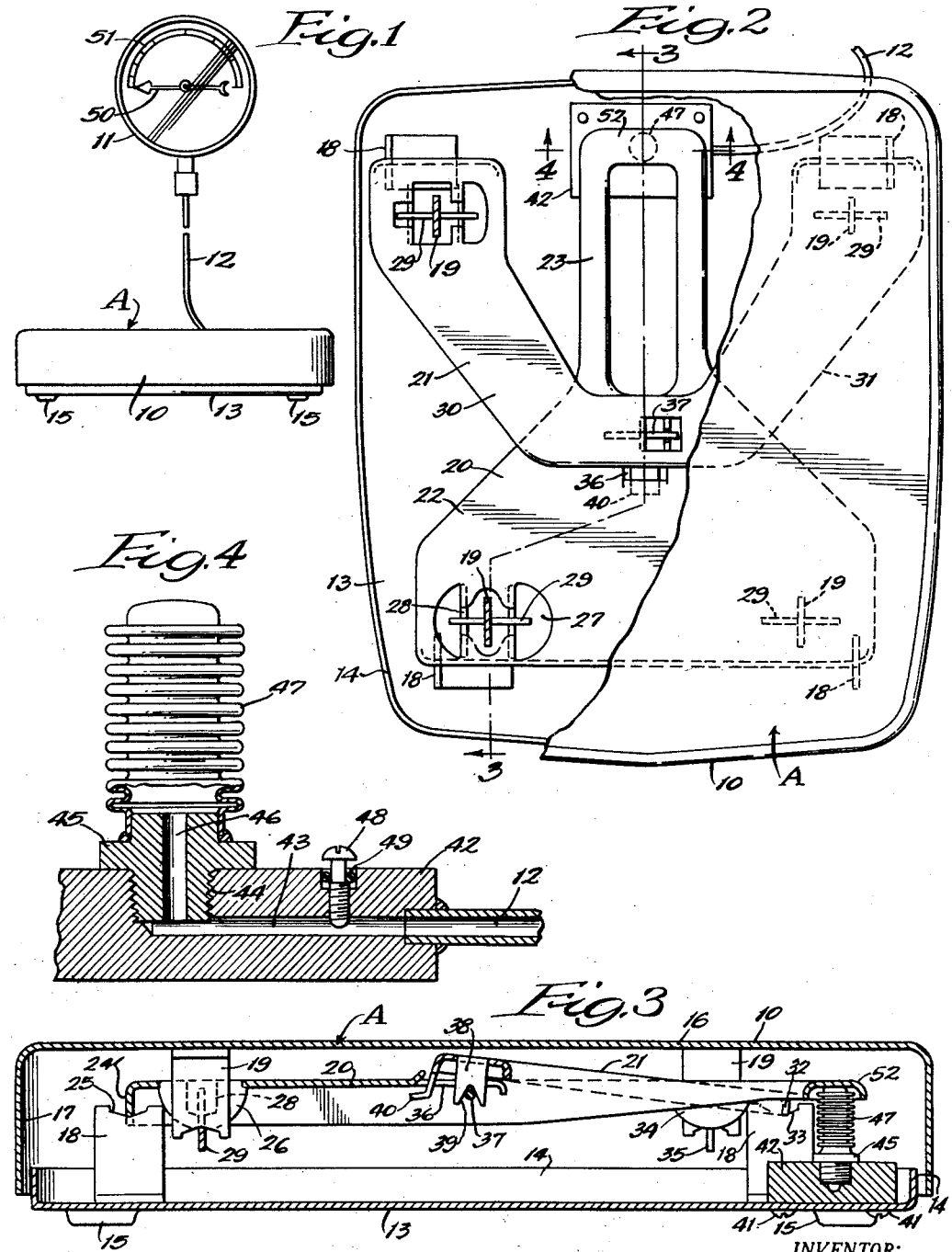
INVENTOR:
Chauncey Gordon Reynard,
BY
Dawson, Tilton & Graham
ATTORNEYS.

United States Patent Office 2,795,410
Patented June 11, 1957

2,795,410

BATHROOM SCALE

Chauncey Gordon Reynard, Fort Wayne, Ind., assignor to C. G. Reynard, Inc., Fort Wayne, Ind., a corporation of Indiana Application December 1, 1954, Serial No. 472,406

2 Claims. (Cl. 265—47)

This invention relates to a weighing device, and more particularly to a bathroom scale. The scale is useful in weighing and indicating the magnitude of a load imposed thereon, as for example, when a person steps onto the platform of the scale.

A great number of bathroom scales are now available and the prices thereof range from a few dollars to substantial sums of money. To some extent the accuracy of the scales is related to the price charged therefor. Most of the scales, however, and particularly those that are low priced, have a considerable degree of error and further, the precise indication of the magnitude of any given weight may vary from day to day with the same scale and it has also been found that different samples of the same model scale will provide different weight indications for a given predetermined weight. The user of these scales then cannot expect great accuracy and must also appreciate that the margin of error is variable and may shift from day to day.

One of the important disadvantages in the less expensive bathroom scales is that in the less expensive models the platform and its support levers that transfer a weight imposed upon the platform to a dial are relatively instable and a fair degree of accuracy in the weight indication can be obtained only when the weight is properly centered upon the platform. Such centering of the weight cannot be expected when persons using the scales step on and off hurriedly and do not understand that their weight should be properly centered on the platform. As a result, off-center loading and any tilting of the platform as a result of improper positioning of the load will cause binding and inaccuracy in the weight indications.

Another problem in obtaining accurate weight indications is that the inherent construction of the bathroom scales now available requires that the calibrated dials be located adjacent the platforms and it is therefore difficult to read the dials. Further error can exist then in the simple reading of the weight indication provided by the dials of commercial scales.

It is, accordingly, an object of this invention to provide a weighing device particularly useful as a bathroom scale and that provides much greater accuracy than the scales now available. Still another object of the invention is to provide a bathroom scale that is relatively inexpensive and that can utilize the same type of platform suspension now found in many of the most inexpensive scales, but that provides, nevertheless, great accuracy in the weighing of loads imposed upon the weigh platform. Still another object is in the provision of a bathroom scale wherein the calibrated dial is readily movable from place to place so that it can be located in a position that provides ease and convenience in the reading thereof. A further object of the invention is in providing a bathroom scale wherein off-center imposition of the loads upon the weigh platform will not substantially affect the accuracy of the weight indications provided by the scale.

Still a further object is to provide means in the bathroom scale of this invention for preventing hunting of the calibrated dial so that the dial comes right up to the proper weight and holds in that position and further maintains such position even though there may be slight shifting of the weight upon the platform or jiggling or other movement of the platform. Yet a further object of the invention is to provide a bathroom scale having fluid pressure response mechanism, preferably hydraulic, whereby the magnitude of a load imposed upon the weigh platform is transferred by a fluid pressure column to a calibrated fluid pressure dial. Yet a further object of the invention is to provide a bathroom scale wherein weighing is accomplished through a pressure fluid system in which the weight is imposed upon a fluid column through a bellows that acts to confine the pressure fluid, the system being always maintained under a pressure of predetermined magnitude for overcoming the inherent distorting forces of the bellows so that the indicator dial or needle is always returned accurately to zero position when the system is unloaded. Still a further object is in providing a bathroom scale that is small and compact and attractive in appearance, and that while it can be made inexpensively is accurate and is equipped with a dial that may be shifted to the most advantageous positions. Additional objects and advantages will appear as the specification proceeds.

An embodiment of the invention is illustrated in the accompanying drawing, in which—

Figure 1 is an end view in elevation of the scale of my invention; Fig. 2 is a top plan view of the scale with the exception of the indicator therefor and in which a portion of the weigh platform has been broken away to show the interior construction; Fig. 3 is a longitudinal sectional view taken on the line 3—3 of Fig. 2; and Fig. 4 is a broken transverse sectional view taken on the line 4—4 of Fig. 2.

Illustrated in Figure 1 is a platform scale that is designated generally with the letter A, and that is particularly useful as a bathroom weighing device. The scale A comprises a platform section 10, an indicator or calibrated dial unit 11, and a conduit 12 that is connected to the platform section 10 and the indicator 11 and transfers pressure fluid therebetween as will be hereinafter described in detail.

The platform section 10 is provided with a base 13 that is equipped with upwardly extending peripheral side walls 14. The base 13 is preferably provided with four spaced-apart feet 15 that may be rubber-like pads that support and cushion the platform section upon a floor or other support surface. Supported above the base 13 for free vertical movement relative thereto is a weigh platform 16 having depending peripheral side walls 17. The base member 13 is equipped with four upwardly extending fulcrum members or posts 18 that are arranged in pairs, two at each end of the base, as is seen best in Figure 2. The posts 18 are rigidly secured to the base 13 and extend upwardly therefrom. Similarly, the weigh platform 16 is provided with four spaced-apart load imposing members 19. The members 19 are arranged in pairs adjacent the opposite ends of the weigh platform, as is seen best in Figure 2. Lever members 20 and 21 are fulcrumed on the posts 18 and have loads imposed thereon through the load transfer members 19.

As is seen best in Figure 2, the lever member 20 is equipped with a large body section 22 that merges inwardly into a tongue 23. The body section 22 is equipped adjacent the outer end thereof with a depending edge portion 24 that is received within a generally V-shaped recess 25 provided in the fulcrums or posts 18 adjacent that end of the base 13. Preferably the lower edge of the wall 24 is V-shaped or is in the form of a knife edge so that the lever 20 may be pivoted relatively freely and with a minimum of frictional resistance within the V-shaped recesses 25 of the fulcrums 18. As is shown best in Figure 3, the body section 22 of the lever 20 is provided adjacent each side thereof with a pair of spaced-apart, depending ears 26 that may be formed by striking out areas from the body section 22 and by bending those areas downwardly. If the ears 26 are provided in this manner, openings 27 will remain in the body section, as is seen in Figure 2.

The spaced-apart ears 26 have aligned recesses 28 therein that receive the end portions of a pivot member 29 that has a depending central portion extending downwardly between the spaced-apart ears 26. The pivot members 29 are supported for free pivotal movement upon the ears 26 and have a recessed central portion that receives the posts 19 therein. Loads imposed upon the weigh platform 16 are thereby transferred to the posts 19 and pivot members 29 to the ears 26 and lever member 20 that provides the ears.

In a similar manner the lever member 21, which is generally U-shaped and provides spaced legs 30 and 31, is provided adjacent the outer edge thereof with a depending wall 32 that is pivotally received within a recess 33 with which the posts 18 adjacent that end of the scale are equipped. Each of the legs 30 and 31 is provided with spaced-apart ears 34 that receive the pivot members 35 therein that in turn carry the posts 19 that are aligned therewith. The knife edges and V-shaped recesses are used to minimize frictional resistance to movement of the lever arms, and other support arrangements such as anti-friction bearings may be used and will provide a more stable support and minimize friction even more.

Centrally the lever 20 is provided with a recess 36 and extending across the recess is a pin 37 that has bearing thereon a load transfer member 38 provided with a generally V-shaped recess 39 therein that receives the pin 37. The lever 21 is also equipped with a downwardly and laterally turned leg 40 that is adapted to abut the underside of the lever 20 to prevent inadvertent separation of the lever members in the event that the scale is turned upside down or when the weigh platform 16 is removed from the base. Generally the weigh platform 16 will be held in position upon the base 13 by suitable means such as stop studs that operate to prevent the platform from being lifted free from the base and that serve also to stabilize the platform relative to the base and thereby prevent accidents that are sometimes caused by a sudden tipping of the platform, when it is held in position by springs, and a load is applied along an edge thereof. Such means are well known in the art and will not be described. It is apparent that when a weight is imposed upon the platform 16 that a portion thereof will be transferred to the lever 21 through the depending posts 19, the pivot member 35 and the ears 34. Similarly, the weight will be transferred from the lever 21 to the lever member 20 by means of the load transfer member 38 and pin 37.

Rigidly secured to the base 13 by means of screws 41, or other suitable devices, is a connection block 42 provided with a flow passage 43 therethrough that is in open communication with the conduit 12. The block member 42 is provided also with a threaded opening 44 communicating directly with the passage 43 and that threadedly receives a coupling 45 having a passage 46 extending therethrough. A bellows member 47 is rigidly secured to the coupling 45, and the interior thereof is in open communication with the passage 46.

The bellows 47 functions generally in a conventional manner, and is adapted to confine a pressure fluid that fills the interior of the bellows, the passages 46 and 43, and the tube or conduit 12. Interposed in the passage 43 is a means for restricting the size of the passage so as to retard the flow of fluid in either direction therethrough. In the specific form shown in Figure 4, the valve member comprises an adjustable needle valve 48 that is threadedly received within an appropriate opening in the block 42, and that has a nose portion extending into the passage 43. An O-ring, or other sealing arrangement, 49 may be provided to prevent the escape of pressure fluid from the passage 43.

The indicator member 11, may take various forms and in the variety illustrated in Figure 1 is provided with a needle 50 and with a calibrated scale 51. The interior mechanism of the indicator 11 is conventional and functions to swing the needle 50 to a position upon the calibrated scale 51 that is indicative of the magnitude of the pressure within the conduit 12. The pressure of the fluid within the conduit 12 in turn is dependent upon the magnitude of the load imposed upon the weigh platform 16. It is apparent from Figure 3 that the bellows 47 is positioned so that it is in engagement with the end 52 of the tongue 23 that is provided by the lever member 20.

The conduit 12 may be either rigid or flexible, and preferably is flexible so that the indicator 11 can be shifted to various positions that will make its accessibility and readability greater. A number of different materials may be employed in the making of the flexible conduit 12, and, for example, certain plastics, such as "Saran," have been found satisfactory.

In use of the structure a neat and compact package for shipment and handling can be provided for the conduit 12 is flexible and the indicator 11 can be placed adjacent the platform section 10. To set up the scale the platform section 10 is simply positioned at a desired location and the indicator 11 is moved to some position where it can be read easily. For example, if the scale is to be used in a bathroom, the section 10 is placed upon the floor and the indicator 11 may be hung upon the wall. Alternatively, the indicator 11 might be laid on top of the weigh platform 16 and when one desires to use the scale the indicator 11 is held in the hand where it is readily read while standing upon the platform 16.

A load imposed upon the weigh platform 16 will be transferred through the depending posts 19 to the lever members 20 and 21 through the arrangement already described. The lever members will be pivoted downwardly about the fulcrum posts 18 that support the same. The knife edges and V-shaped recesses minimize friction so that there is little mechanical hysteresis in the transfer of the loads from the platform 16 to the lever members. The levers add the load portions carried respectively by the posts 19 adjacent the forward and rear ends of the scale. The combined individual loads are imposed upon the fluid column within the bellows 47 by engagement of the end portion 52 of the tongue 23 with the upper end of the bellows.

The bellows acts only to confine the pressure fluid and, in effect, the load is transferred from the levers to the fluid column directly. The fluid column will move by the valve 48 and into the conduit 12 and from there into the indicator 11 where it will cause the needle 50 to swing to a position relative to the calibrated scale 51 that will accurately represent the magnitude of the load imposed upon the weigh platform.

Hunting or oscillation of the needle 50 is prevented by restricting the passage 43 to retard the flow of fluid in either direction through that passage. It will be appreciated that when the passage is restricted, a load imposed upon the column through the bellows 47 will cause a relatively slow movement of the pressure fluid into the indicator 11 and the needle 50 thereof will swing to the proper point on the scale uniformly and relatively slowly. That is, the needle will move up to the proper position, but will not tend to move therebeyond and to oscillate about the precise point on the scale that is indicative of the load being carried by the weigh platform. Similarly, when a load is removed from the platform 16, the fluid will flow slowly past the restriction or needle valve 48 and into the bellows 47 to reposition the needle 50 at zero. It will be apparent that while the adjustable needle valve 48 is a desirable and suitable way for providing the passage restriction, the restriction may be formed in any manner and preferably one that will minimize production problems.

Through appropriate calibration of the scale 51 various pressure fluids may be employed. I prefer, however, to use a liquid, such as oil. The fluid pressure system is always under some minimum pressure. That is to say, when the needle 50 is positioned at the zero point on the scale 51, there is, nevertheless, some pressure slightly greater than atmospheric within the fluid pressure system. The pressure selected should be great enough so that it overcomes the inherent distorting forces of the bellows 47. For example, the bellows is not perfectly elastic and will not return to a predetermined initial position after each compression thereof. Further, the precise position of the bellows 47 varies somewhat with the temperature. Therefore, if the fluid pressure system were designed so that the needle 50 would register zero when there was no pressure in the fluid within the bellows and flow conduits, etc., the needle 50 would not always return to this zero position after each use of the scale, and further, would not return to zero position where the temperature surrounding the bellows 47 might vary. I overcome this by maintaining the fluid within the bellows and flow conduits at some pressure, for example, about five pounds per square inch, above atmospheric. Therefore, when the weigh platform 16 is unloaded, the pressure within the fluid system always causes the bellows 47 to assume or to return to some predetermined position, and the needle 50 and calibrated scale 51 are arranged so that zero weight is indicated at such position of the bellows.

It will be apparent that since the weigh platform 16 is mounted for free vertical movement relative to the base 13, that it can be moved considerably if the weight imposed thereon is shifted, as for example, from foot to foot of an individual standing thereon. Ordinarily such jiggling of the platform 16 results in oscillation of the indicator and inaccurate weight indications for the load is not properly applied to the indicator. In my scale, however, jiggling of the platform 16 in this manner does not cause appreciable movement of the needle 50, if any, for the restriction or needle valve 48 prevents rapid movement of fluid through the passage 43 and the needle 50 tends to maintain a single preselected position relative to the scale 51. Further, weight is transferred through the levers directly to the fluid column, the bellows 47 acting to confine the fluid, and there is no distortion or inaccuracy of the reading in the event that the weight is not properly centered on the weigh platform 16. This accuracy results because pressures at all points within the liquid within the fluid pressure system are the same and so long as any force is applied to the bellows 47 it will cause an increase in pressure in the liquid within the fluid flow system and that increase in pressure will result in a weight indication by the needle 50.

I prefer to provide an indicator 11 that is equipped with an adjustable dial so that the scale may be compensated easily and accessibly by this zero adjustment for changes in temperature and atmospheric pressure.

It is apparent, then, that I have provided a scale that is extremely accurate and that overcomes numerous disadvantages in prior art structures. At the same time it can be made economically and attractive in appearance for it can be small and compact. Also the dial may be positioned where it is readily visible.

While in the foregoing specification an embodiment of the invention has been illustrated and described in considerable detail for purposes of illustration, it will be apparent to those skilled in the art that numerous changes can be made in these details without departing from the spirit and principles of the invention.

I claim:

1. In a bathroom scale, a base, a weigh platform mounted for free vertical movement relative to said base, a bellows between said platform and said base, lever means operative between said weigh platform and said bellows for transferring a load imposed upon the weigh platform to the bellows, said lever means comprising a pair of interconnected cooperating lever members being movable between raised and lowered positions and being provided with stop means for limiting the extent of upward movement thereof, a fluid pressure indicator calibrated to indicate weights, conduit means in open communication with said indicator, and restriction means for retarding the flow of pressure fluid through said conduit means, said bellows, indicator and conduit means comprising a pressure fluid system wherein a positive pressure is maintained which is greater than the pressure necessary to move said lever members into fully raised positions when said platform is unloaded.

2. In a bathroom scale, a base, a weigh platform mounted for free vertical movement relative to said base, a bellows secured to said base beneath said platform, a pair of oppositely disposed lever members pivotally mounted upon said base for supporting said platform, one of said lever members having its free end supported upon the other of said members and having a leg portion engageable with said other member to limit the extent of upward pivotal movement of said levers, said other lever member having its free end disposed upon said bellows for compressing the same in response to a load imposed upon said weigh platform, a fluid pressure indicator calibrated to indicate weights, a flexible conduit communicating with said indicator and said bellow, said conduit being provided with restriction means for retarding the flow of pressure fluid therethrough, said bellows, indicator and conduit comprising a pressure fluid system wherein a positive pressure is maintained, said pressure being slightly greater than the fluid pressure necessary to pivot said lever members into fully raised positions when said platform is unloaded, whereby, said leg portion of said one lever member firmly engages said other lever member when no load is imposed upon said platform.

References Cited in the file of this patent

UNITED STATES PATENTS

| | | |
|---|---|---|
| 601,339 | Freeman | Mar. 29, 1898 |
| 1,030,099 | Llobert | June 18, 1912 |
| 1,458,920 | Troll | June 12, 1923 |
| 1,621,320 | Griffin | Mar. 15, 1927 |
| 1,818,001 | Moorhouse | Aug. 11, 1931 |
| 1,895,502 | Vernet et al. | Jan. 31, 1933 |
| 2,516,545 | Brewster | July 25, 1950 |
| 2,663,562 | Hendrickson | Dec. 22, 1953 |
| 2,668,045 | Provenzano | Feb. 2, 1954 |
| 2,704,661 | Maugh | Mar. 22, 1955 |

FOREIGN PATENTS

| | | |
|---|---|---|
| 501,071 | France | Jan. 16, 1920 |
| 35,911 | Denmark | Apr. 26, 1926 |
| 806,967 | France | Oct. 5, 1936 |